US008561443B2

(12) United States Patent
Sun et al.

(10) Patent No.: US 8,561,443 B2
(45) Date of Patent: Oct. 22, 2013

(54) SEMI-ACTIVE ELECTRORHEOLOGICAL FLUID CLUTCH FOR ELECTRONIC DOOR LOCK

(75) Inventors: Fanping Sun, Glastonbury, CT (US); Zaffir A. Chaudhry, South Glastonbury, CT (US); John M. Milton-Benoit, West Suffield, CT (US); Ulf J. Jonsson, South Windsor, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 190 days.

(21) Appl. No.: 12/998,624

(22) PCT Filed: Nov. 28, 2008

(86) PCT No.: PCT/US2008/013222

§ 371 (c)(1), (2), (4) Date: May 10, 2011

(87) PCT Pub. No.: WO2010/062282

PCT Pub. Date: Jun. 3, 2010

(65) Prior Publication Data

US 2011/0209507 A1 Sep. 1, 2011

(51) Int. Cl.
*B60R 25/02* (2013.01)

(52) U.S. Cl.
USPC ................. 70/222; 70/277; 70/278.7; 70/472

(58) Field of Classification Search
USPC ............. 70/218, 220, 224, 277, 278.1–278.3, 70/278.7, 283, 467, 472
See application file for complete search history.

(56) References Cited

U.S. PATENT DOCUMENTS

| | | | | |
|---|---|---|---|---|
| 3,896,644 | A * | 7/1975 | Nagy et al. | 70/149 |
| 4,993,747 | A | 2/1991 | Borlinghaus | |
| 5,103,779 | A | 4/1992 | Hare, Sr. | |
| 5,123,348 | A | 6/1992 | Henson | |
| 5,640,863 | A | 6/1997 | Frolov | |
| 6,394,239 | B1 | 5/2002 | Carlson | |
| 6,651,468 | B2 * | 11/2003 | Aramburu et al. | 70/222 |
| 6,837,081 | B2 * | 1/2005 | Ruano Aramburu et al. | 70/218 |
| 7,097,212 | B2 | 8/2006 | Willats et al. | |
| 7,168,276 | B2 * | 1/2007 | Errani et al. | 70/278.7 |
| 7,188,495 | B2 * | 3/2007 | Errani et al. | 70/278.7 |
| 7,930,916 | B2 * | 4/2011 | Tamezane et al. | 70/387 |
| 8,001,818 | B2 * | 8/2011 | Imedio Ocana et al. | 70/472 |
| 2004/0177663 | A1 * | 9/2004 | Walsh et al. | 70/472 |

* cited by examiner

*Primary Examiner* — Suzanne Barrett

(74) *Attorney, Agent, or Firm* — MH2 Technology Law Group, LLP

(57) ABSTRACT

A clutch for an electronic door lock includes a first shaft, a second shaft, a spring, a rheological fluid, and a plunger. The second shaft has an aperture therein and is axially co-aligned with the first shaft and is rotatably mounted adjacent the rotatable first shaft. The spring is disposed in the aperture in the second shaft. The rheological fluid is held within the aperture and is capable of changing viscosities in response to the application of an electrical current across the fluid. The plunger is biased by the spring into selective coupling engagement with the first shaft and is capable of selective motion into the aperture in response to contact by a camming surface of the first shaft due to relative rotation of the first shaft with respect to the second shaft.

17 Claims, 5 Drawing Sheets

SEMI-ACTIVE ELECTRORHEOLOGICAL FLUID CLUTCH FOR ELECTRONIC DOOR LOCK

BACKGROUND

The present invention relates to door locks, and more particularly to an electrorheological fluid clutch for an electronic door lock.

Electronic door locks typically include a mechanical lock and an electronic control for authorizing the use of the mechanical lock. A portion of the mechanical lock secures the door to the door frame. The electronic control may include, for example, a reader that permits data to be read from a coded medium such as a magnetic card, proximity card, or memory key. When a card or key with valid data is presented to the electronic control, the control permits an outer handle or door knob to operate a shaft of the mechanical lock by actuating a prime mover to either release a latch that was preventing the handle or knob from turning, or engage a clutch that couples a shaft of the handle or knob to the shaft of the mechanical lock.

The mechanical lock and electronic control components (including the prime mover and latch/clutch) of electronic door locks are commonly powered by alkaline batteries which typically have a service life of between about two to three years. This limited battery service life necessitates changing the batteries several times over the service life of the door lock; a process that increases the operating costs of businesses which employ the electrical locks. Many prime movers, including most piezoelectric elements such as benders, exhibit capacitive characteristics such as a large inrush of power when initially electrically activated. This inrush of power operates as a short circuit load to the batteries, negatively impacting their battery life.

Electronic door lock latches incorporating a rheological fluid have been developed. One such latch utilizing rheological fluid is disclosed in U.S. Pat. No. 7,097,212 to Willats et al. Unfortunately, the Willats' latch suffers from drawbacks that affect the lock's performance and battery life. First, the rheological fluid in Willats is housed in a large cylinder which also has a piston disposed therein. For the Willats latch to operate, a sufficient current must be applied across the full cylinder to cause the viscosity of the rheological fluid to increase sufficiently to resist the movement of the piston. Because power consumption is directly related to the geometry (volume) of the contained rheological fluid, the use of the large cylindrical volume of fluid in Willats requires a relatively large inrush of power from the batteries. The Willats' latch also utilizes numerous moving parts including linkages and arms whose operation may be compromised by dust and wear. The moving parts and aforementioned cylinder make the latch rather large and bulky thereby necessitating that the latch be housed in an escutcheon rather than the door itself. The addition of the latch to the escutcheon may increase its size and thereby decrease the aesthetic appeal of the electronic door lock.

SUMMARY

A clutch for an electronic door lock includes a first shaft, a second shaft, a spring, a rheological fluid, and a plunger. The second shaft has an aperture therein and is axially co-aligned with the first shaft and is rotatably mounted adjacent the rotatable first shaft. The spring is disposed in the aperture in the second shaft. The rheological fluid is held within the aperture and is capable of changing from a first state in which the fluid has a first viscosity to a second state in which the fluid has a second viscosity in response to the application of an electrical current across the fluid. The plunger is biased by the spring into selective coupling engagement with the first shaft and is capable of selective motion into the aperture in response to contact by a camming surface of the first shaft due to relative rotation of the first shaft with respect to the second shaft. When the rheological fluid is in the second viscosity state and the plunger is contacted by the camming surface, the fluid exerts a hydraulic blocking force which impedes the motion of the plunger and maintains coupling engagement between the plunger and the first shaft.

In another aspect, a method of coupling an outer door handle shaft with an inner door handle shaft includes applying an electrical current to a rheological fluid housed internally within the inner door handle shaft. The application of the electrical current changes the rheological fluid from a first viscosity state to a second viscosity state. In the second viscosity state, the rheological fluid exerts a hydraulic blocking force sufficient to impede the linear motion of the plunger into the aperture. The outer door handle shaft is rotated relative to the inner door handle shaft to contact a camming surface of the outer door handle shaft with the plunger thereby allowing for coupling rotation of the inner door handle shaft with the outer door handle shaft.

DETAILED DESCRIPTION

Figure 1:
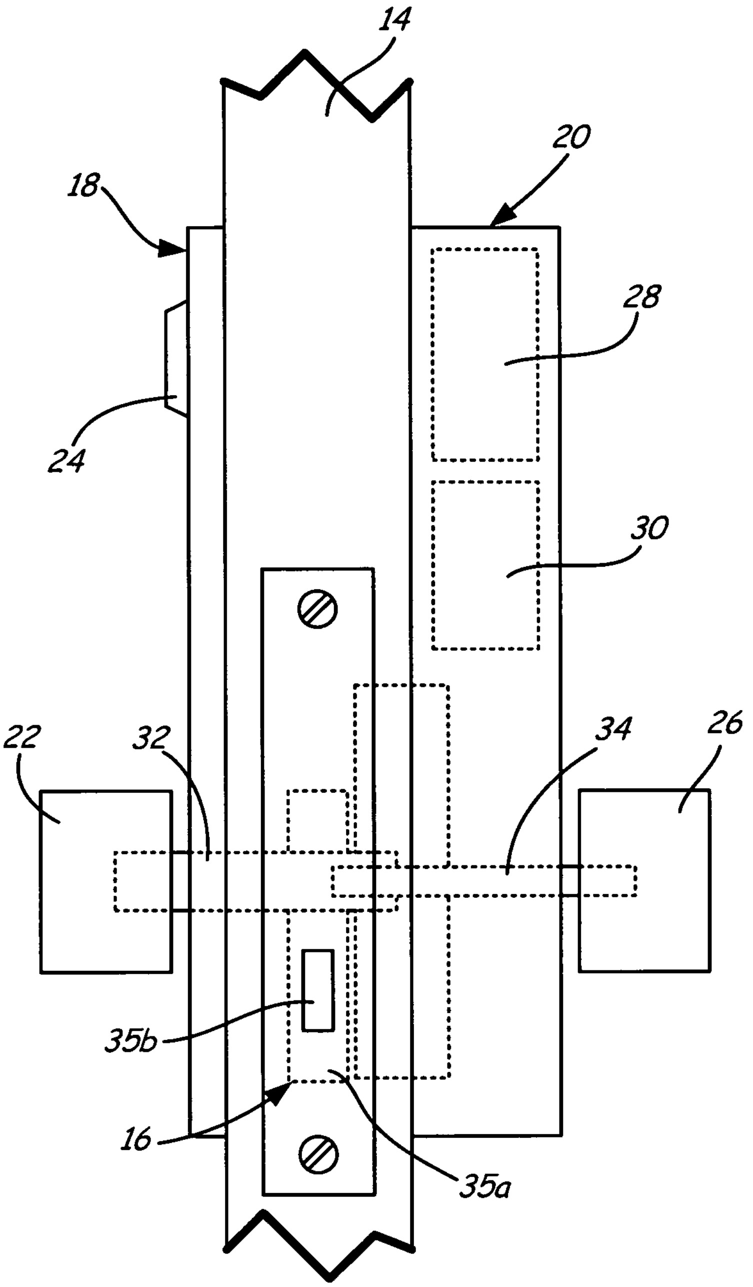
FIG. 1 is a schematic view an electronic door lock including a low energy clutch.

FIG. 1 is a schematic view of an electronic door lock 10 including a low energy clutch 12. The door lock 10 is disposed in a door 14. The door lock 10 includes a latch mechanism 16, an outer escutcheon 18, and an inner escutcheon 20. The outer escutcheon 18 includes an outer handle or knob 22 and a reader 24. The inner escutcheon 20 includes an inner handle or knob 26, a control circuit 28, and batteries 30. Additionally, the door lock 10 includes a handle shaft 32 and a lock shaft 34. The latch mechanism 16 includes a body 35*a* and a bolt or latch 35*b*.

The electronic lock 10 extends through the door 14 between an interior side and an outer side. The door 14 can be part of vehicle or part of a residential/commercial/hospitality structure. The clutch 12, latch mechanism 16, outer escutcheon 18, and inner escutcheon 20 are partially housed within a mortise in the door 14. The electronic lock 10 includes the outer escutcheon 18 which extends from the outer side of the door 14, and the inner escutcheon 20 which extends from the interior side of the door 14.

The outer escutcheon 18 is adapted with the reader 24 to receive a coded medium such as a magnetic card, proximity card, or memory key. The outer handle 22 rotatably projects from the lower portion of the outer escutcheon 18. Interfacing the outer escutcheon 18 on the interior portion of the door 14 is the inner escutcheon 20. The inner escutcheon 20 houses the control circuit 28 and batteries 30 therein. The inner handle 26 rotatably projects from a lower portion of the inner escutcheon 20. The inner handle 26 connects to the lock shaft 34 which is rotatably mounted to extend through the inner escutcheon 20 into the clutch 12 in the door 14. The lock shaft 34 connects to the body 35*a* of the latch mechanism 16. The body 36 actuates or allows the latch 35*b* to be actuated out of a door frame when unlocked. When the latch mechanism 16 is locked, the body 35*a* retains the latch 35*b* in the door frame. The clutch 12 selectively couples the lock shaft 34 with the handle shaft 32. The handle shaft 32 is rotatably mounted in the outer escutcheon 18 and extends therethrough to connect with the outer handle 22.

When the electronic lock 10 (and hence the latch mechanism 16) is in a locked state, the handle shaft 32 can be rotatably actuated by the user's depressing or rotating the outer handle 22. However, the rotation of the handle shaft 32 is independent of the lock shaft 34 which disposed adjacent to and is not in contact with the handle shaft 32. Thus, the latch mechanism 16 does not respond to the user's rotation of the outer handle 22 and the electronic lock 10 remains locked.

The reader 24 is electrically connected to the control circuit 28 which is activated to control a switch and allow the batteries 30 to supply electrical current through an electrical circuit to a portion of the clutch 12. The batteries 30 also provide electrical current for the components of the electronic lock 10 including the reader 24 and control circuit 28.

For the electronic lock 10 and latch mechanism 16 to enter an unlocked state allowing the user to swing the door 14 open, a valid key card (or other coded medium) is presented to the reader 24 by the user. The reader 24 signals the control circuit 28 which electronically activates the switch in the electrical circuit. With the switch activated, the batteries 30 supply current to the clutch 12. More particularly, the batteries 30 supply a small amount of current to an electrorheological fluid housed in one of the shafts 32 or 34. In response to the current, the electrorheological fluid changes from a first state in which the fluid has a first viscosity, to a second state in which the fluid has a second greater viscosity. In the greater viscosity state, the fluid exerts a hydraulic blocking force sufficient to keep a portion of the clutch in coupling engagement between the shafts 32 and 34. This engagement allows the shafts 32 and 34 to be rotated together to unlock the latch mechanism 16.

In one embodiment, the control circuit 28 can also activate a drive assembly which rotates one or both of the shafts 32 and 34 prior to and after the coupling engagement of the clutch 12. Once the clutch 12 is engaged, the drive produced by the drive assembly on the shaft(s) 32 and/or 34, or the actuation of the handle shaft 32 by the user (or the combination of both), rotates the shafts 32 and 34 to unlock the latch mechanism 16.

The clutch 12 utilizes low energy (and therefore draws small amounts of power from the batteries 30) to couple the shafts 32 and 34 for many reasons. First, only a small current needed to change the rheological fluid from the first viscosity state to the second viscosity state and thereby allow the fluid in the second viscosity state to exert the hydraulic blocking force which keeps a portion of the clutch in coupling engagement between the shafts 32 and 34. Second, in one embodiment, human (user) torque on the outer handle 22 can be used to initially rotate the handle shaft 32 prior to coupling engagement of the clutch 12. Human (user) torque can also be used to rotate the handle shaft 32 and lock shaft 34 after coupling engagement of the clutch 12. If a drive assembly is used in the electronic door lock 10, the drive assembly only works to rotate (or aid in the user's rotation) of the shafts 32 and 34, rather than having to maintain coupling engagement of the clutch 12 between the shafts 32 and 34. The resulting reduction in operating resistance or load to the drive assembly allows the size of the drive assembly (specifically the prime mover of the drive assembly) to be reduced and reduces the cost of drive assembly and electronic lock 10. The service life of the batteries 30 are increased because only a small amount of power is drawn to electrically activate the rheological fluid to maintain the coupling engagement of the clutch 12 between the shafts 32 and 34. Also, the design of the clutch 12 makes the use of a prime mover/drive assembly in lieu of or in addition to human (user) actuation torque unnecessary for most applications unless so desired.

The configuration of the electronic lock shown in FIG. 1 is exemplary, and therefore, neither the arrangement of the lock components nor the type of components illustrated are intended to be limiting in any way. FIG. 1 simply illustrates one embodiment of an electronic lock that would benefit from the low energy clutch disclosed herein.

Figure 2:
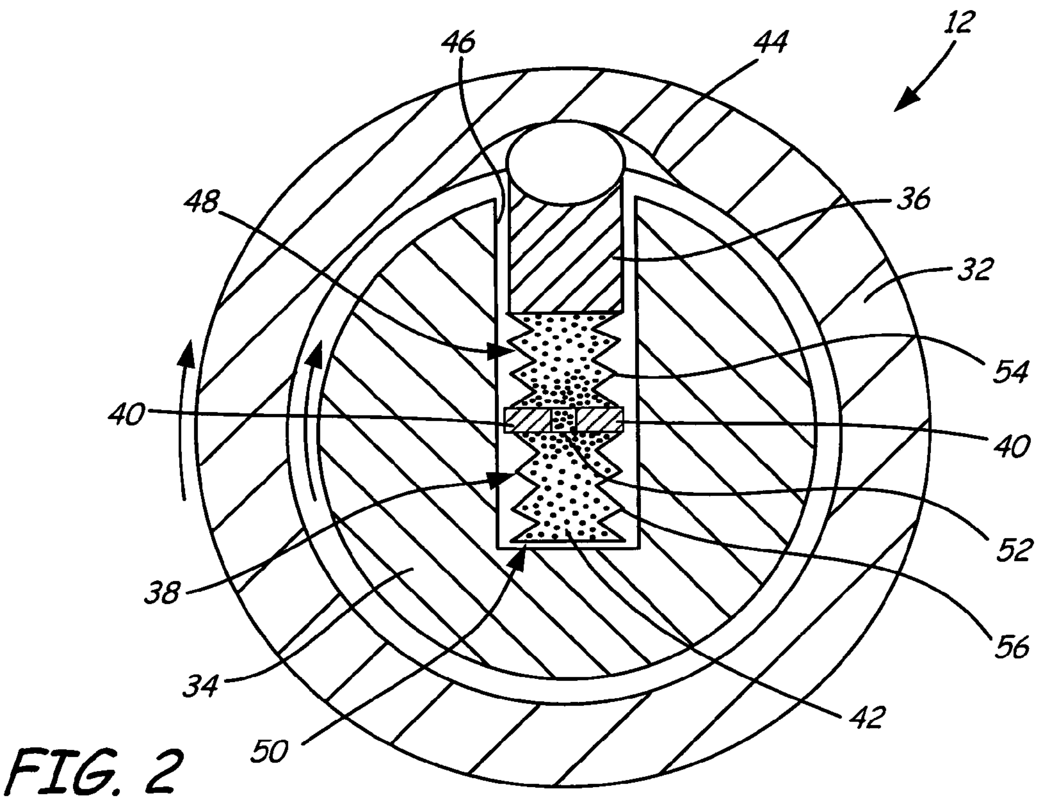
FIG. 2 is a sectional view of one embodiment of the clutch in an unlocked position.

FIG. 2 is a sectional view of one embodiment of the clutch 12 in an unlocked engaged position with a section of the lock shaft 34 and handle shaft 32 removed to illustrate the components of the clutch 12. The clutch 12 includes a plunger 36, a bellow assembly 38, a restriction 40 and electrorheological fluid 42. The handle shaft 32 includes a camming surface 44. The lock shaft 34 has an aperture or blind hole 46 therein. The bellow assembly 38 includes a first chamber 48 and a second chamber 50. The restriction 40 has an orifice 52 therein. The bellow assembly 38 includes a first spring 54 and a second spring 56.

In FIG. 2, the lock shaft 34 is axially co-aligned with the axis of rotation of the handle shaft 32. The portion of the lock shaft 34 shown is disposed adjacent the handle shaft 32 and extends within a recess in the handle shaft 32 in one embodiment. As illustrated, the plunger 36 projects from the lock shaft 34 to selectively engage the handle shaft 32. The engagement of the plunger 36 between the lock shaft 34 and handle shaft 32 couples the shafts 32 and 34 so that both shafts 32 and 34 rotate synchronously together to allow the lock shaft 34 to unlock the latch mechanism 16 (FIG. 1). The handle shaft 32 and lock shaft 34 are biased into position relative to one another by return springs (not shown) which engage and rotate the shafts 32 and 34 to the position shown (with the camming surface 44 generally interfacing with the plunger 36) when the handle shaft 32 is not being actuated by the primary mover or user (FIG. 1).

The plunger 36 is movably connected to the lock shaft 34 by the extendible and retractable bellow assembly 38. The bellow assembly 38 has first and second springs 54 and 56 which bias the plunger 36 into engagement with the handle shaft 32. In one embodiment, the bellow assembly 38 houses the restriction 40 and electrorheological fluid 42 therein. The restriction 40 is selectively electrically activated to maintain coupling engagement between the plunger 36 and the handle shaft 32. More particularly, the electrorheological fluid 42 is capable of changing from a first state, in which the fluid has a first lower viscosity (shown in FIG. 3), to a second state in which the fluid has a second increased viscosity in response to the application of an electrical current across the fluid. The restriction 40 contacts the electrorheological fluid 42 and is capable of being electrically activated to apply the electrical current across the electrorheological fluid 42. In response the electrical current, the electrorheological fluid 42 changes from the first state to the second state. When the electrorheological fluid 42 is in the second viscosity state (illustrated in FIG. 2), and the plunger 36 is contacted by the handle shaft 32, the electrorheological fluid 42 exerts a hydraulic blocking force sufficient to impede motion of the plunger 36 into the lock shaft 34. This blocking force, in combination with the bias of the first and second springs 54 and 56, maintains the coupling engagement of the plunger 36 with the handle shaft 32.

More particularly, the plunger 36 projects from the lock shaft 34 to selectively engage the camming surface 44 which interfaces with the lock shaft 34. In one embodiment, the camming surface 44 is disposed in an internal cavity in the handle shaft 32. When the electrorheological fluid 42 is in the first viscosity state rather than the second viscosity state, the plunger 36 is capable of selective generally linear motion into the aperture 46 (thereby depressing the first and second springs 54 and 56) in response to contact by the camming surface 44 due to relative rotation of the handle shaft 32 with respect to the lock shaft 34. The aperture 46 in the lock shaft 34 houses the bellow assembly 38. The electrorheological fluid 42 can be contained solely within the bellow assembly 38 or within both the bellow assembly 38 and the aperture 46. However, the bellow assembly 38 is divided into the first chamber 48 and the second chamber 50 by the restriction 40. Both chambers 48 and 50 of the bellow assembly 38 contain electrorheological fluid 42. The orifice 52 extends through the restriction 40 and allows for communication of the electrorheological fluid 42 between the chambers 48 and 50.

In one embodiment, rather than being housed within the bellow assembly 38, the restriction 40 can movably or rigidly extend between the walls of the aperture 46. The extendible and retractable first spring 54 forms the upper portion of the bellow assembly 38. An upper portion of the first spring 54 connects to the plunger 36 while a lower portion of the first spring 54 contacts a first surface of the restriction 40. The first spring 54 biases the plunger 36 into engagement with the handle shaft 32. The second spring 56 forms a lower portion of the bellow assembly 38. An upper portion of the second spring 56 contacts a second surface of the restriction 40 while a lower portion of the second spring 56 can contact the bottom of the aperture 46 when the second spring 56 is depressed. The first and second springs 54 and 56 both contain the electrorheological fluid 42 which communicates through the orifice 52 between the springs 54 and 56 in response to the displacement of the plunger 36 within the aperture 46.

When the restriction 40 is electrically activated as discussed subsequently, the electrorheological fluid 42 within the orifice 52 and adjacent the restriction 40 changes from the first state with a lower apparent viscosity, to the second state with an increased apparent viscosity. The electrorheological fluid 42 can be quickly changed back-and-forth between these two states because the apparent viscosities of electrorheological fluids reversibly change in response to the application (or non-application) of electric current. For example, the electrorheological fluid 42 adjacent the orifice 52 and restriction 40 could go from the consistency of a liquid to that of a gel, and back, with response times on the order of milliseconds. When the electrorheological fluid 42 in the vicinity of the orifice 52 assumes the second viscosity state, for example having a consistency of a gel, the communication of electrorheological fluid 42 between the first chamber 48 and the second chamber 50 is reduced or halted. The volume of electrorheological fluid 42 within the first chamber 48 generally has an increased viscosity and generally cannot be displaced into the second chamber 50. Thus, the electrorheological fluid 42 within the first chamber 48 reacts with a hydraulic blocking force to the force exerted on the plunger 36 by contact between the plunger 36 and the camming surface 44 as the handle shaft 32 rotates relative to the lock shaft 34. The hydraulic blocking force, in combination with the bias of the first spring 54, maintains the coupling engagement of the plunger 36 with the handle shaft 32.

The geometry of the clutch 12 allows for a very small amount of power to be drawn from the batteries 30 for the electrorheological fluid 42 to exert a hydraulic blocking force on the plunger 36 sufficient to maintain engagement between the plunger 36 and the handle shaft 32. More particularly, only the electrorheological fluid 42 within the orifice 52 and adjacent the restriction 40 need be changed from the first viscosity state to the second viscosity state for the electrorheological fluid 42 in the first chamber 48 to exert the hydraulic blocking force on the plunger 36 with sufficient force to maintain engagement between the plunger 36 and the handle shaft 32. The clutch design also minimizes the number of moving parts utilized by the clutch 12 thereby reducing the likelihood that the clutch 12 will be compromised by dust and wear. Most components of the clutch 12 are housed internally within the lock shaft 34. This arrangement reduces the need to house the components of the clutch 12 in the outer or inner escutcheon 18 or 20 (FIG. 1). Although the plunger 36 and bellow assembly 38 are illustrated as extending into the aperture 46 in the lock shaft 34 in FIG. 2, in another embodiment, these components could extend into an aperture in the handle shaft 32 and the lock shaft 34 could include a camming surface rather than with the handle shaft 32 as illustrated in FIG. 2. In this alternative configuration, the blocking force would maintain coupling engagement of the plunger with the lock shaft 34 rather than the handle shaft 32 as illustrated.

FIG. 2B is a sectional view of one embodiment of the clutch 12 in an unlocked engaged position with a section of the lock shaft 34 and handle shaft 32 removed to illustrate the components of the clutch 12. FIG. 2B illustrates many of the same components and structures as the embodiment shown in FIG. 2, however, the embodiment of FIG. 2B includes an electrode 61 and an isolator 62.

Figure 2A:
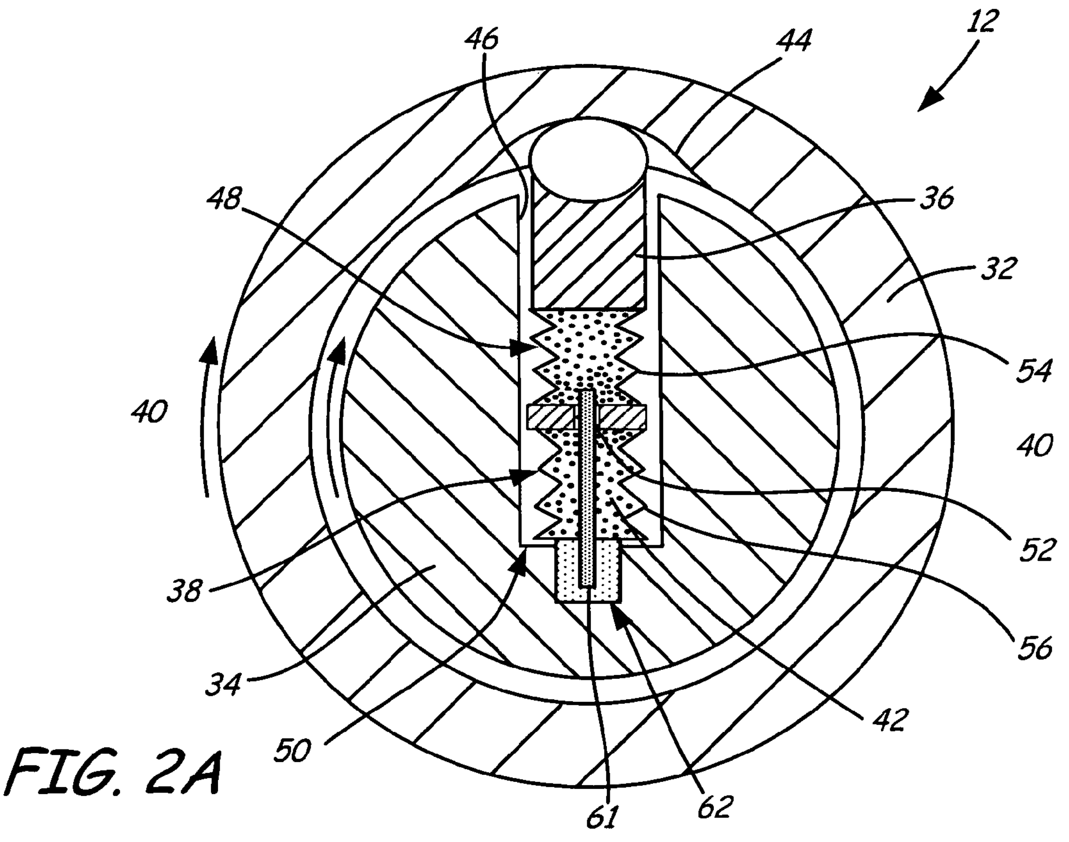
FIG. 2B is a sectional view of another embodiment of the clutch in the unlocked position.

The electrode 61 is disposed in the lock shaft 34 and extends into the aperture 46. More specifically, the electrode 61 extends through the base portion of the second spring 56 of the bellow assembly 38. The electrode 61 passes through the electrorheological fluid 42 to be coaxially located in the orifice 52 in the restriction 40. The electrode 61 is electrically connected to the batteries 30 (FIG. 1). The electrical isolator 62 surrounds a base of the electrode 61 within the lock shaft 34 and extends into a lower portion of the aperture 46 and bellow assembly 38. The electrode 61 extends into the aperture 46 and is capable of exerting an electric field of about 3 kV/mm. Electrical current supplied to the electrode 61 electrically activates the restriction 40 which is also electrically connected to the batteries 30 (FIG. 1). The electrorheological fluid 42 within the orifice 52 (about the electrode 61) and adjacent the restriction 40 changes from the first state with a lower apparent viscosity (shown in FIG. 3), to the second state with an increased apparent viscosity (illustrated in FIGS. 2 and 2A). The electrorheological fluid 42 can be quickly changed back-and-forth between these two states because the apparent viscosities of electrorheological fluids reversibly change in response to the application (or non-application) of electric current. When the electrorheological fluid 42 in the vicinity of the orifice 52 assumes the second viscosity state, the communication of electrorheological fluid 42 between the first chamber 48 and the second chamber 50 is reduced or halted. In the second viscosity state, when the plunger 36 is contacted by the handle shaft 32, the electrorheological fluid 42 exerts a hydraulic blocking force sufficient to impede motion of the plunger 36 into the lock shaft 34. This blocking force, in combination with the bias of the first and second springs 54 and 56, maintains the coupling engagement of the plunger 36 with the handle shaft 32.

Figure 3:
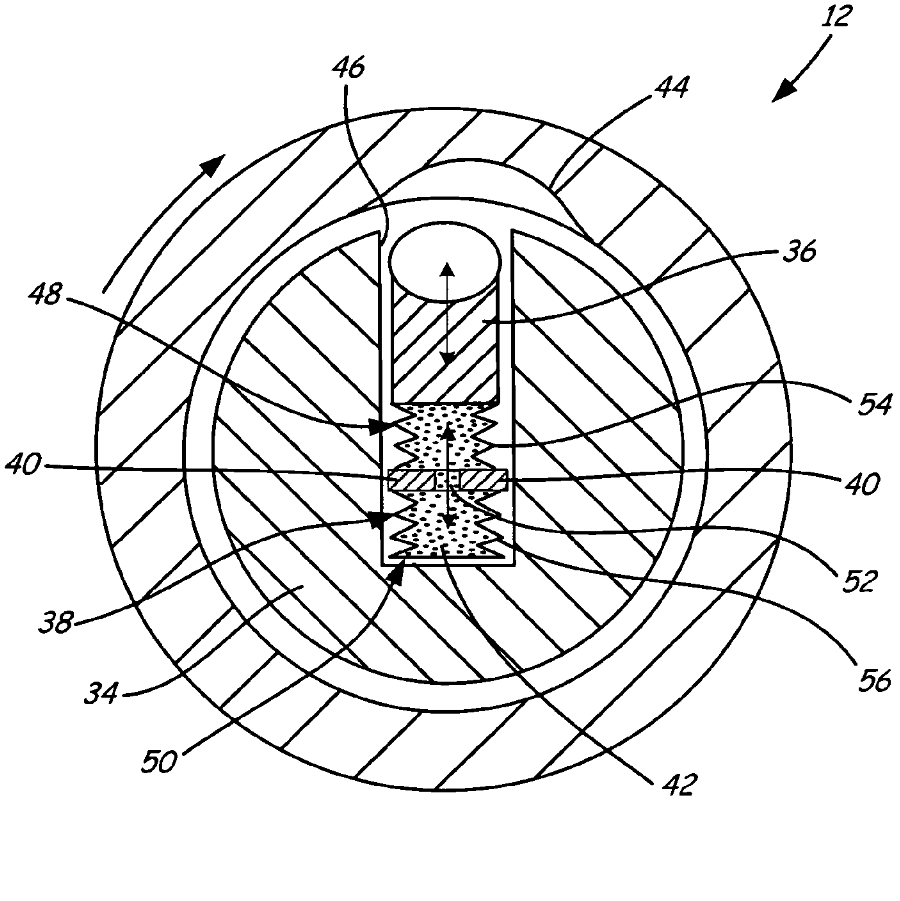
FIG. 3 is a sectional view of the clutch of FIG. 2 in a locked position.

FIG. 3 is a sectional view of the clutch 12 in a locked position with a section of the lock shaft 34 and handle shaft 32 removed to illustrate the components of the clutch 12.

In FIG. 3, the restriction 40 is electrically deactivated (as will be discussed subsequently) such that the electrorheological fluid 42 assumes the first state having the first lower apparent viscosity. In the lower viscosity state, the electro-electrorheological fluid 42 communicates through the orifice 52 between the first chamber 48 and the second chamber 50 in response to linear motion of the plunger 36 in the aperture 46. More specifically, the relative rotation of the handle shaft 32 with respect to the lock shaft 34 brings the camming surface 44 into contact with the plunger 36 which is biased generally outward into the rotational path of the handle shaft 32 by the bellow assembly 38. The force that results from the contact of the camming surface 44 with the plunger 36 overcomes the generally outward contacting bias of the bellow assembly 38 and moves the plunger 36 generally linearly into the aperture 46 thereby compressing the bellow assembly 38. The linear motion of the plunger 36 into the aperture 46 displaces a portion of the electrorheological fluid 42 from the first chamber 48 to the second chamber 50 through the orifice 52 rather than creating a blocking force large enough to maintain engagement between the plunger 36 and the handle shaft 32. The bias force the springs 54 and 56 exerts on the plunger 36 eventually restores the plunger 36 back into contact the handle shaft 32. The movement of the plunger 36 draws the portion of the electrorheological fluid 42 back from the second chamber 50 into the first chamber 48 through the orifice 52.

Because the contact of the camming surface 44 with the plunger 36 forces the plunger 36 linearly into the aperture 46, the relative rotation of the handle shaft 32 does not rotate the lock shaft 34. Thus, the latch mechanism 16 remains in the locked position (FIG. 1).

Figure 4A:
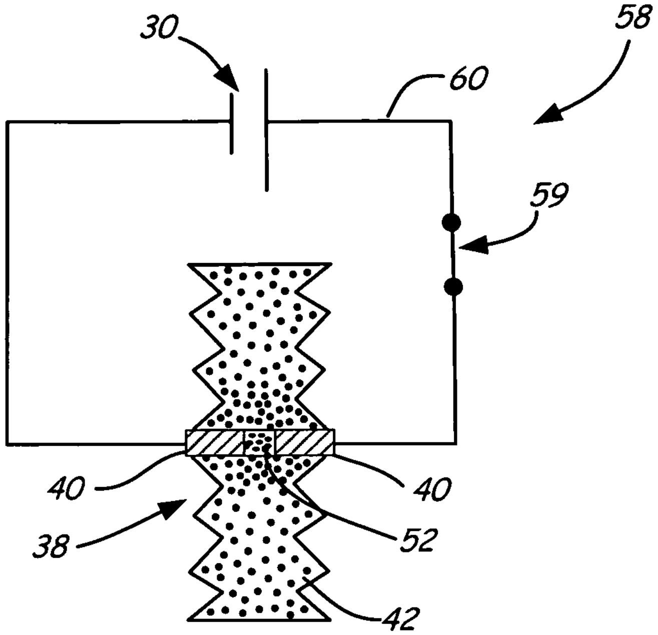
FIG. 4A is a schematic view of an electrical circuit which transfers current from a battery to a restriction in the clutch shown while the clutch is in the unlocked position.
Figure 4B:
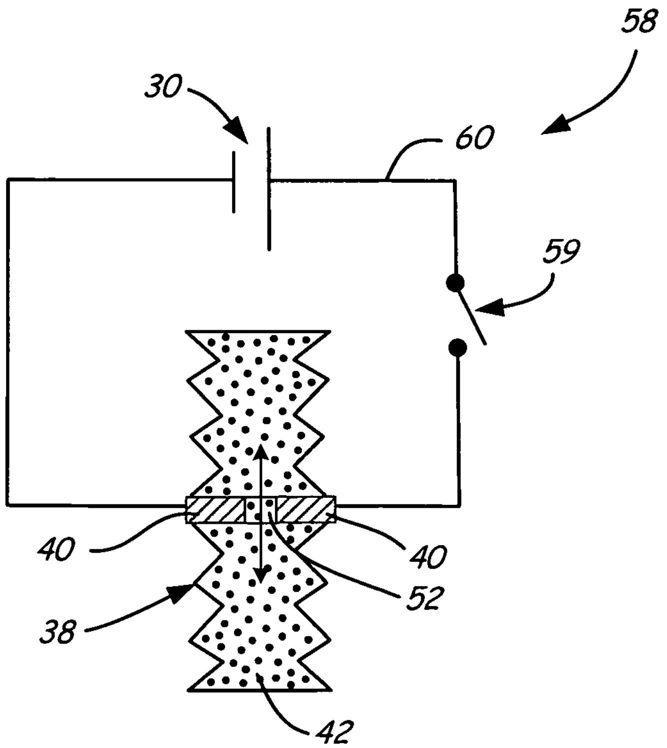
FIG. 4B is a schematic view of the electrical circuit of FIG. 4A while the clutch is in the locked position.
Figure 4C:
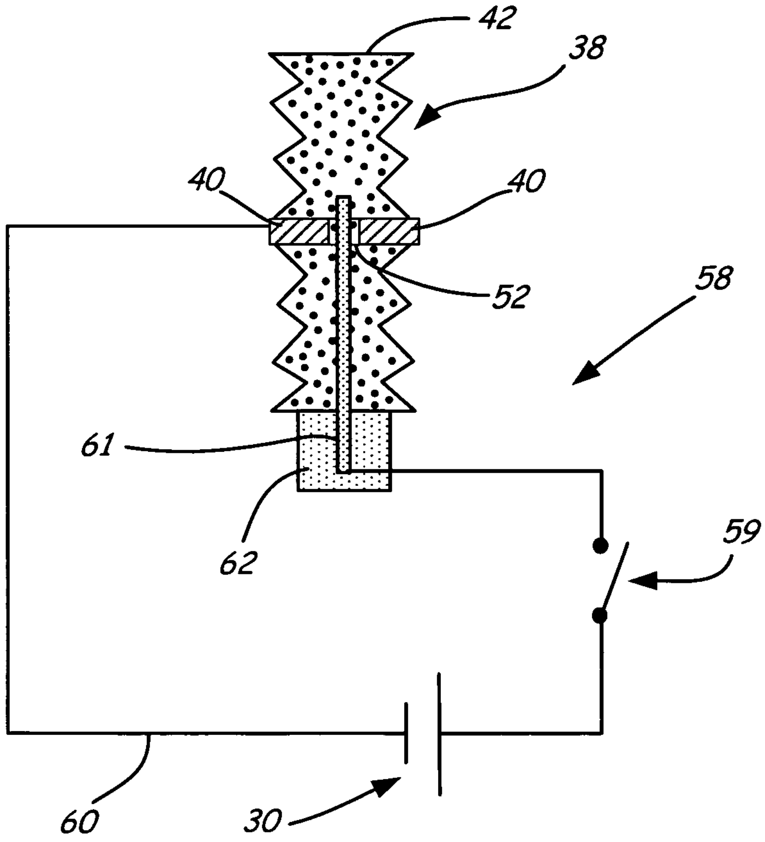
FIG. 4C is a schematic view of another electrical circuit which transfers current from the battery to a rheological fluid in the clutch shown.

FIG. 4A is a schematic view of a electrical circuit 58 in a closed position allowing current to flow from the battery 30 to the restriction 40 in the clutch 12. FIGS. 4B and 4C are schematic views of the electrical circuit 58 in an open position in the clutch 12. In addition to the battery 30 and restriction 40, the electrical circuit 58 includes a switch 59 and a wire 60.

In FIG. 4A, when a valid key card (or other coded medium) is presented to the reader 24 by the user, the control circuit 28 is activated to close the switch 59 and allow the batteries 30 to supply electrical current through the wire 60 to the restriction 40 in the clutch 12 (FIG. 1). More particularly, the wire 60 forms a loop which electrically connects the batteries 30 and the switch 59, the switch 59 and the restriction 40, and the restriction 40 and the batteries 30. When the switch 59 is closed, the restriction 40 is electrically activated. The electrorheological fluid 42 assumes the second state having the second higher apparent viscosity. In this viscosity state, the electrorheological fluid 42 is capable of exerting a sufficient hydraulic blocking force to maintain engagement between the plunger 36 and the camming surface 44 in response to the force exerted on the plunger 36 by contact between the plunger 36 and the camming surface 44 as the handle shaft 32 rotates relative to the lock shaft 34 (FIG. 2). The hydraulic blocking force, in combination with the bias of the springs 54 and 56, maintains the coupling engagement of the plunger 36 with the handle shaft 32 thereby allowing the shafts 32 and 34 to rotate synchronously to unlock the latch mechanism 16 (FIGS. 1 and 2).

In FIGS. 4B and 4C, a valid key card has not been presented to the reader 24 by the user, and the control circuit 28 has not been activated (FIG. 1). Therefore, the switch 59 in the electrical circuit 56 is in the open position and virtually no electrical current flows through the wire 60 from the batteries 30. Therefore, virtually no current passes across the restriction 40 and electrorheological fluid 42. Thus, when the switch 59 is open, the restriction 40 and electrode 61 (FIG. 4C) are electrically deactivated. The electrorheological fluid 42 assumes the first state having the first lower apparent viscosity. In the first state, the electrorheological fluid 42 does not exert a hydraulic blocking force capable of maintaining engagement between the plunger 56 and the handle shaft 32 when the plunger 36 is contacted by the camming surface 44 (FIG. 3). Thus, when the electrorheological fluid 42 is in the first state the contact the camming surface 44 makes with the plunger 36 forces the plunger 36 generally into the aperture 46 (thereby depressing the springs 54 and 56 of the bellow assembly 38) and out of the path of rotation of the handle shaft 32. The motion of the plunger 36 into the aperture 46 displaces a portion of the electrorheological fluid 42 from the first chamber 48 to the second chamber 50 through the orifice 52 rather than creating a blocking force large enough to maintain engagement between the plunger 56 and the handle shaft 32 (FIG. 3).

Although the present invention has been described with reference to preferred embodiments, workers skilled in the art will recognize that changes may be made in form and detail without departing from the spirit and scope of the invention.

The invention claimed is:

1. A clutch for an electronic door lock, comprising:

a rotatable first shaft having a camming surface;

a second shaft with an aperture therein, the second shaft is axially co-aligned with and rotatably disposed adjacent the first shaft;

a spring disposed in the aperture;

a rheological fluid held within the aperture, the fluid capable of changing from a first state in which the fluid has a first viscosity to a second state in which the fluid has a second viscosity in response to the application of an electrical current across the fluid;

a plunger biased by the spring into selective coupling engagement with the first shaft and capable of selective motion into the aperture in response to contact by the camming surface due to relative rotation of the first shaft with respect to the second shaft; and a restriction disposed within the aperture and having an orifice that extends from a first side of the restriction to a second side of the restriction, the orifice allowing communication of rheological fluid therethrough;

wherein when the rheological fluid is in the second viscosity state and the plunger is contacted by the camming surface the fluid exerts a hydraulic blocking force which impedes the motion of the plunger into the aperture and maintains coupling engagement between the plunger and the first shaft.

2. The clutch of claim 1, wherein:

the restriction is capable of being selectively electrically activated to apply current to the rheological fluid adjacent the orifice thereby changing the fluid from the first viscosity to the second viscosity adjacent-the orifice, and wherein the change from the first viscosity to the second viscosity obstructs the flow of rheological fluid through the orifice and thereby allows the fluid to exert the hydraulic blocking force sufficient to impede the motion of the plunger into the aperture.

3. The clutch of claim 2, further comprising an electrode disposed within the orifice and configured to apply current to the orifice thereby allowing an electric field to be created within the orifice.

4. The clutch of claim 2, wherein the spring includes a first spring which contacts the plunger and the restriction and a second spring which contacts the restriction and a bottom of the aperture.

5. The clutch of claim 4, wherein the restriction divides the aperture into a first chamber and a second chamber, the first chamber houses the first spring and the second chamber houses the second spring, wherein the orifice in the restriction allows for communication of the rheological fluid between the first and second chambers.

6. The clutch of claim 1, wherein the viscosity of the fluid in the second state is greater than the viscosity of the fluid in the first state.

7. The clutch of claim 1, further comprising a latch mechanism operably connected to the second shaft, wherein the engagement of the plunger with the first shaft couples the second shaft with the first shaft to transmit an actuating rotation which unlocks the latch mechanism.

8. The clutch of claim 1, further comprising a door handle that is operably connected to the first shaft such that actuation of the door handle rotates the first shaft relative to the second shaft.

9. An electronic door lock, comprising:
- a rotatable door handle;
- a handle shaft operably connected to the door handle and capable of being rotationally actuated thereby, the handle shaft having an inner camming surface;
- a lock shaft with an aperture therein, the lock shaft axially co-aligned with and rotatably mounted adjacent the handle shaft and rotatably connected to a latch mechanism;
- a bellow spring disposed in the aperture;
- a rheological fluid held within the bellow spring, the fluid having a first state in which the fluid has a first viscosity and a second state in which the fluid has a second viscosity;
- a plunger biased by the bellow spring into selective coupling engagement with the handle shaft and capable of selective linear motion into the aperture in response to contact with the inner camming surface due to relative rotation of the handle shaft with respect to the lock shaft; and
- a restriction disposed within the bellow spring and having an orifice that extends from a first side of the restriction to a second side of the restriction, the orifice allowing communication of rheological fluid therethrough,
- wherein the restriction is capable of being selectively electrically activated to change the rheological fluid adjacent the orifice from the first viscosity to the second viscosity, in the second viscosity state the rheological fluid exerts a hydraulic blocking force sufficient to impede the linear motion of the plunger into the aperture, and
- wherein the hydraulic blocking force maintains coupling engagement between the plunger and the handle shaft when the plunger is rotationally contacted by the inner camming surface thereby coupling the lock shaft with the handle shaft to unlock the latch mechanism.

10. The clutch of claim 9, wherein the restriction is electrically activated in response to a signal from an electronic control circuit.

11. The clutch of claim 9, wherein the electrical activation is provided by an electrode coaxially located within the orifice of the restriction.

12. The clutch of claim 10, wherein the door handle is operably connected to the handle shaft such that actuation of the door handle rotates the handle shaft relative to the lock shaft.

13. The clutch of claim 10, wherein the bellow spring includes a first spring which contacts the plunger and the restriction and a second spring which contacts the restriction and a bottom of the aperture.

14. The clutch of claim 13, wherein the restriction divides the aperture into a first chamber and a second chamber, the first chamber houses the first spring and the second chamber houses the second spring, wherein the orifice in the restriction allows for communication of the rheological fluid between the first and second chambers.

15. The clutch of claim 10, wherein the fluid is an electrorheological fluid and a potential difference is applied to the fluid in the second state and substantially no electrical current is applied across the fluid in the first state.

16. A method of coupling an outer door handle shaft with an inner door handle shaft in an electronic door lock, comprising:
- applying an electrical current to a rheological fluid housed internally within the inner door handle shaft, wherein the application of the electrical current changes the rheological fluid from a first viscosity state to a second viscosity state, and wherein the second viscosity state exerts a hydraulic blocking force sufficient to impede linear motion of a plunger into the inner door handle shaft; and
- rotating the outer door handle shaft relative to the inner door handle shaft to contact a camming surface of the outer door handle shaft with the plunger thereby allowing for coupling rotation of the inner door handle shaft with the outer door handle shaft,
- wherein the rheological fluid is housed within a first chamber and a second chamber which are divided by a restriction, and
- the restriction comprises an orifice that allows a portion of the rheological fluid to flow between the first chamber and the second chamber through when the rheological fluid is in the first viscosity state.

17. The method of claim 16, wherein the electrical current is applied to the rheological fluid adjacent the orifice thereby changing the rheological fluid from the first viscosity to the second viscosity, and
- wherein the change from the first viscosity to the second viscosity obstructs the flow of rheological fluid through the orifice and thereby allows the rheological fluid in the first chamber to exert the hydraulic blocking force sufficient to impede the linear motion of the plunger into the aperture.

* * * * *